UNITED STATES PATENT OFFICE.

LEONHARD LEDERER, OF WALDHOF, NEAR MANNHEIM, GERMANY, ASSIGNOR TO C. F. BOEHRINGER & SOHNE, OF SAME PLACE.

PROCESS OF MAKING DERIVATIVES OF AMIDO-CROTONIC ACID.

SPECIFICATION forming part of Letters Patent No. 499,301, dated June 13, 1893.

Application filed April 25, 1892. Serial No. 430,568. (No specimens.)

*To all whom it may concern:*

Be it known that I, LEONHARD LEDERER, a subject of the Emperor of Germany, residing at Waldhof, near Mannheim, in the Grand Duchy of Baden, Germany, have invented certain new and useful Improvements in the Art of Preparing Derivatives of Amido-Crotonic Acid; and I do hereby declare the following to be a full, clear, and exact description of the invention, such as will enable others skilled in the art to which it appertains to make and use the same.

My invention relates to the preparation of a number of derivatives of amido-crotonic acid, which I have found possess pronounced therapeutic such as anti-febrile and anti-neuralgic effects, the dose being about one gram. In the present application it is my purpose to cover and to give a description of the production of one of these derivatives, viz: acetyl-amido-crotonyl anilid, having the formula: $C_{12}H_{12}N_2O$.

I prefer to prepare this compound by the following process:—I add acetyl acetanilid $(C_{10}H_{11}NO_2$ or $C_6H_5.NH.C_2H_2O.C_2H_3O)$ alone or in solution to an aqueous or alcoholic solution of ammonia in slight excess and let the same stand at the ordinary temperature. After the lapse of from twenty-four to thirty hours a transposition takes place, water being separated and $NH_2$ combining with the aceto acetanilid, as expressed in the following equation:—

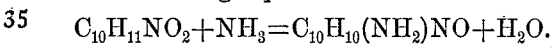

$C_{10}H_{11}NO_2 + NH_3 = C_{10}H_{10}(NH_2)NO + H_2O$.

The product so obtained is amido-crotonyl-anilid, which crystallizes out of the mixture and which is moderately soluble in most solvents in the cold and may be obtained pure by once crystallizing out of alcohol. It crystallizes in colorless needles having a melting point of 146° to 147° Celsius.

II.—For preparing the acetyl-amido-crotonylanilid, I boil amido-crotonyl-anilid with one and one-half times the quantity of acetic anhydride in connection with a reflex-cooler. The liquid resulting from the reaction is mixed with water after cooling and freed from most of the acetic acid.

The acetyl-derivative is separated from the aqueous solution as an oil by potash, which neutralizes and concentrates the liquor or aqueous solution the said oil being taken up by ether, and easily brought to crystallization after the solvent has been evaporated. It forms colorless crystals and melts at 98° Celsius. Its formula is: $C_{12}H_{12}N_2O$. It is very readily soluble in water, alcohol and chloroform and easily soluble in benzene and toluene.

While I have herein described the process of preparing the intermediate product which I term amido-crotonylanilid, and its product, I do not herein claim the same, inasmuch as it forms the subject-matter of a separate application filed by me on the 11th day of October, 1892, Serial No. 448,575.

While I consider the above the best manner to carry out my invention the same may be varied in many particulars without departing from the same. I do not therefore desire to be limited to the details thus set forth, but

What I claim, and desire to secure by Letters Patent, is—

1. The process which consists in boiling amido-crotonyl-anilid with acetic anhydride, substantially as set forth.

2. The process which consists in boiling amido-crotonylanilid with acetic anhydride, cooling and then mixing the resulting liquid with water, substantially as set forth.

3. The process which consists in boiling amido-crotonylanilid with acetic anhydride, cooling, then mixing the resulting liquid with water and finally separating the acetyl-derivative by adding potash to the mixture, substantially as set forth.

4. The process which consists in boiling amido-crotonylanilid with acetic anhydride, cooling, and mixing with water, then separating the acetyl-derivative by adding potash, and finally taking up the resulting oil by ether, substantially as set forth.

5. The process which consists in boiling amido-crotonyl-anilid with acetic anhydride, cooling and mixing with water then separating the acetyl-derivative by adding potash, taking up the resulting oil by ether, and finally evaporating the ether, substantially as set forth.

6. As a new compound acetyl-amido-crotonylanilid, whose formula is $C_{12}H_{12}N_2O$, which is readily soluble in water, alcohol and chloroform, easily soluble in benzene and toluene, forms colorless crystals and melts at 98°, Celsius.

In testimony whereof I affix my signature in presence of two witnesses.

LEONHARD LEDERER.

Witnesses:
FERD. BOPPE,
ALBERT TSCHIRPE.